(12) United States Patent
Toyama et al.

(10) Patent No.: US 7,900,007 B2
(45) Date of Patent: Mar. 1, 2011

(54) HOST DEVICE, STORAGE DEVICE, AND METHOD FOR ACCESSING STORAGE DEVICE

(75) Inventors: Masayuki Toyama, Osaka (JP); Takuji Maeda, Osaka (JP); Tomoaki Izumi, Osaka (JP); Shouichi Tsujita, Kyoto (JP); Masahiro Nakanishi, Kyoto (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 11/571,592

(22) PCT Filed: Jun. 28, 2005

(86) PCT No.: PCT/JP2005/011799
§ 371 (c)(1),
(2), (4) Date: Mar. 19, 2007

(87) PCT Pub. No.: WO2006/006387
PCT Pub. Date: Jan. 19, 2006

(65) Prior Publication Data
US 2007/0255917 A1 Nov. 1, 2007

(30) Foreign Application Priority Data
Jul. 8, 2004 (JP) .................................. 2004-201511

(51) Int. Cl.
*G06F 13/14* (2006.01)
(52) U.S. Cl. ........................ 711/163; 711/115; 711/152
(58) Field of Classification Search .................... 711/163
See application file for complete search history.

(56) References Cited

U.S. PATENT DOCUMENTS

| | | | |
|---|---|---|---|
| 5,408,082 A | 4/1995 | Takagi et al. | |
| 5,794,202 A * | 8/1998 | Kim | 704/270 |
| 7,159,075 B2 | 1/2007 | Moro | |
| 2003/0005241 A1 | 1/2003 | Ueno | |
| 2003/0090953 A1 | 5/2003 | Kawai et al. | |
| 2004/0107316 A1 | 6/2004 | Moro | |
| 2006/0097061 A1 | 5/2006 | Moro | |
| 2007/0168614 A1 * | 7/2007 | Luo et al. | 711/115 |

FOREIGN PATENT DOCUMENTS

| | | |
|---|---|---|
| JP | 2-28741 | 1/1990 |
| JP | 2-050749 | 2/1990 |
| JP | 2-50749 | 2/1990 |
| JP | 05-242002 | 9/1993 |

(Continued)

OTHER PUBLICATIONS

U.S. Appl. No. 11/571,597 to Toyama et al., which was filed Jan. 3, 2007.

(Continued)

*Primary Examiner* — Hetul Patel
(74) *Attorney, Agent, or Firm* — Greenblum & Bernstein, P.L.C.

(57) ABSTRACT

A host device transmits a command from a command transmission unit (101a) along a predetermined command sequence. A storage device (2) receives the command in a command reception unit (202a). An access determination unit (202c) determines the sequence of the command transmitted from the host device (1) and determines that reception of the access to the host device (1) is enabled only when the sequence is identical with a predetermined sequence. Thus, with simple control, it is possible to prevent data destruction by a host device of an old version.

13 Claims, 10 Drawing Sheets

FOREIGN PATENT DOCUMENTS

| | | |
|---|---|---|
| JP | 6-60235 | 3/1994 |
| JP | 2003-015958 | 1/2003 |
| JP | 2003-223623 | 8/2003 |
| JP | 2004-086505 | 3/2004 |

OTHER PUBLICATIONS

English language Abstract of JP 2003-223623.
English language Abstract of JP 05-242002.
English language Abstract of JP 2-28741.
English language Abstract of JP 6-60235.
English language Abstract of JP 2003-015958.
English language Abstract of JP 2-050749.
English language Abstract of JP 2004-086505.

* cited by examiner

HOST DEVICE, STORAGE DEVICE, AND METHOD FOR ACCESSING STORAGE DEVICE

TECHNICAL FIELD

The present invention relates to a host device, storage device, and method for accessing the storage device that execute the initialization of the storage device and data transmission/reception with use of a command, wherein the storage device is connected to the host device.

BACKGROUND ART

In devices (referred to as host devices below) that control digital data such as a digital camera, movie, and portable music player, there is a memory card, as a storage device for retaining digital information, mounting a non-volatile memory. In order to realize compatibility between memory cards manufactured by multiple makers and host devices, a scheme for the host device to access a memory card is standardized. A version of the standard is upgraded along with enlargement of capacity and addition of functions of a memory card. A method for making a host device to execute access by showing different storage capacities to each host device with use of multiple ways of capacity reference is proposed (for example, see Patent document 1).
Patent document 1: Unexamined Patent Publication 2004-86505.

DISCLOSURE OF INVENTION

Problems to be Solved by the Invention

However, the conventional technique described above has following problems. That is to say, there is such a problem that a host device of an old version may destroy data written by a host device of a new version because host devices which are in different versions can access the same storage area. Also, there is such a problem that internal configuration and control of a memory card becomes complex since multiple areas are provided in a memory card and access control based on a host device is executed.

In view of the above mentioned problem, the present invention is designed to provide a host device, storage device, and method for accessing a storage device which can execute access control in simple configuration and control.

Means to Solve the Problems

To solve the problem, a host device which is connected to a storage device via a bus and reads and writes data in the storage device comprising: a command transmission unit for sequentially transmitting a command in a command sequence composed of a set of commands which does not cause change on data stored in the storage device; a response reception unit for accepting a response from the storage device for each command transmission from the command transmission unit and determining whether an error exists or not; and an acceptable/unacceptable access determination unit for enabling access when normal reception is identified by the response reception unit after each command transmission from the command transmission unit and otherwise determining that access to the storage device is unacceptable.

To solve the problem, a storage device which is connected to a host device via a bus and stores and reads data based on a command from the host device comprising: a memory for retaining data given from the host device; a memory control unit for controlling data-reading and data-writing to the memory; a command reception unit for receiving a command issued from the host device and executing processing in accordance with each command; a response transmission unit for returning a response in the case of a predetermined command every time when the command reception unit receives each command; and an access determination unit for determining whether a command received by the command reception unit is a predetermined command sequence or not and accepting access when the command sequence is the predetermined command sequence.

To solve the problem, a method for accessing a storage device by a host device which is connected to the storage device via a bus and reads and writes data in the storage device comprising: sequentially transmitting a command in a command sequence composed of a set of commands which does not cause change on data stored in the storage device, accepting a response from the storage device for each command transmission and determining whether an error exists or not; and enabling access when normal reception is determined after each command transmission and otherwise determining that access to the storage device is unacceptable.

Effectiveness of the Invention

In the present invention, a host device, storage device, and method for accessing a storage device which can execute access control in simple configuration and under simple control can be provided since the storage device determines a sequence of a transmission command from the host device and determines access from the host device as acceptable when the sequence is identical with a predetermined sequence.

DESCRIPTION OF REFERENCE NUMERALS

1 Host device
101 CPU
102 ROM
103 RAM
104 Interface
101a Command transmission unit 101b Response reception unit
101c Access determination unit
2 Storage device
201 Interface
202 Control unit
203 Memory control unit
204 Memory
202a Command reception unit
202b Response transmission unit
202c Access determination unit
3 Bus

BEST MODE FOR CARRYING OUT THE INVENTION

Figure 1:
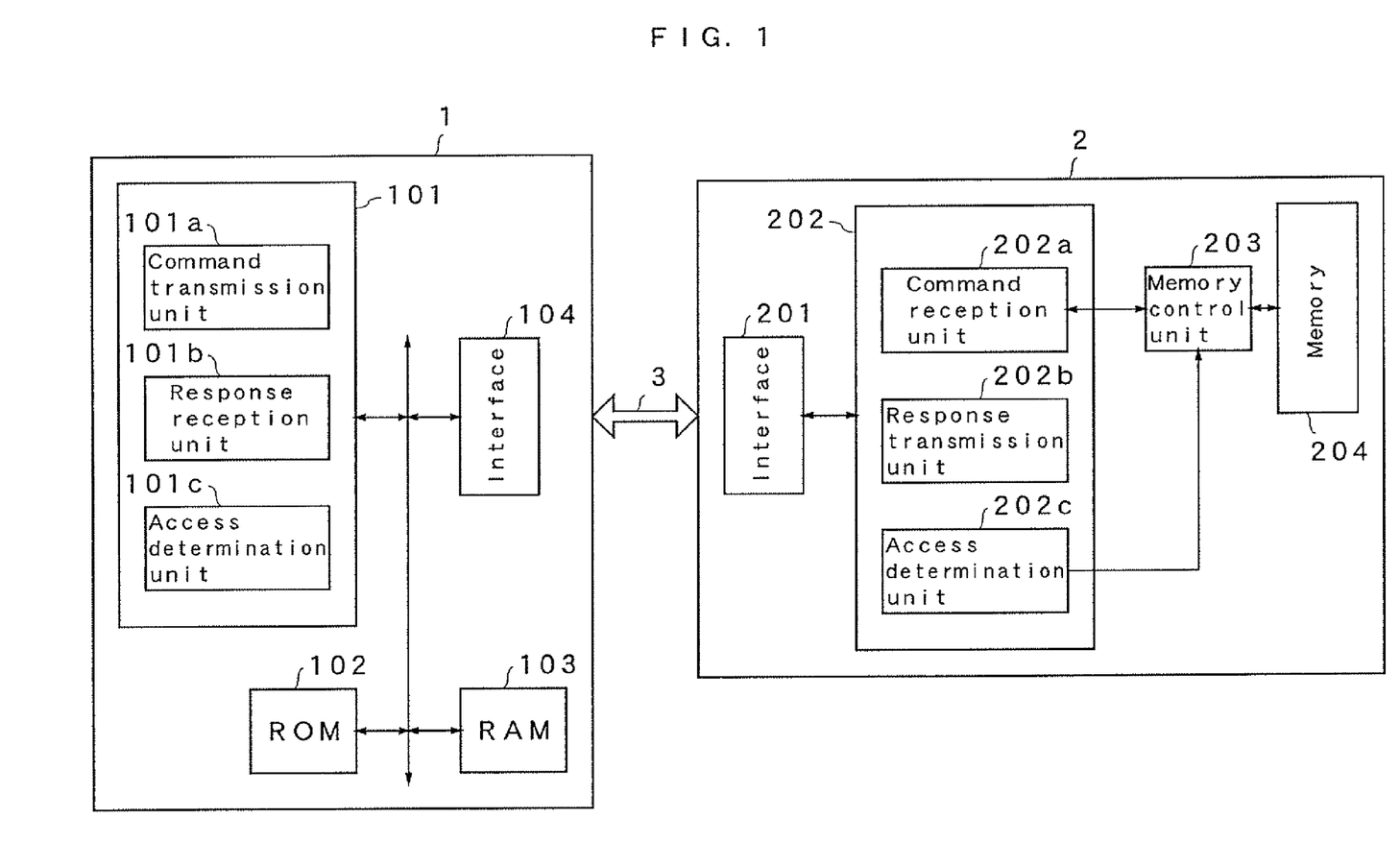
FIG. 1 is a block diagram showing a configuration of a storage system according to an embodiment of the present invention.

FIG. 1 is a block diagram showing a configuration of a storage system according to an embodiment of the present invention. As shown in FIG. 1, the storage system according to the embodiment of the present invention includes a host device 1 and storage device 2 and connects the storage device 2 to the host device 1 with use of a bus 3. The host device 1 includes a CPU 101, ROM 102 for storing one or more programs for the CPU 101, RAM 103 for a work area of the CPU, and interface 104. The interface 104 transmits a command, data, and addresses to the storage device 2 and receives a response. The ROM 102 stores one or more access programs for realizing an access method executed by the CPU 101 and one or more command sequences used by the host device 1. In addition, the CPU 101 achieves a function of a command transmission unit 101a, response reception unit 101b, and access determination unit 101c. The command transmission unit 101a transmits a command sequentially in a command sequence composed of a set of commands retained in the ROM 102 via the interface 104. The response reception unit 101b accepts a response each command transmission from the command transmission unit and determines whether an error exists or not. After each command transmission, the access determination unit 101c determines whether access is acceptable or not in a way that access is approved when normal response is identified by the response reception unit and otherwise access is disapproved.

The storage device 2 includes an interface 201, control unit 202, memory control unit 203, and memory 204. The interface 201 receives a command and data from the host device 1 and transmits a response. In addition, the control unit 202 includes a command reception unit 202a, response transmission unit 202b, and access determination unit 202c. The command reception unit 202a receives a command issued from the host device and executes processing corresponding to each command. The reception transmission unit 202b, each time the command reception unit receives a command, determines whether the command is based on a predetermined command sequence or not, and normally responds in the case of the command of the predetermined command sequence. In addition, the access determination unit 202c determines whether the command received by the command reception unit is the predetermined command sequence or not, and executes processing for accepting access in the case of the predetermined command sequence. The memory control unit 203 controls reading and writing of data from and to the memory 204 and the memory 204 retains data given from the host device. The storage device 2 checks whether a command sequence transmitted from the host device 1 is a predetermined sequence or not and determines access from the host device 1 is acceptable in the case of the predetermined command sequence.

Figure 2:
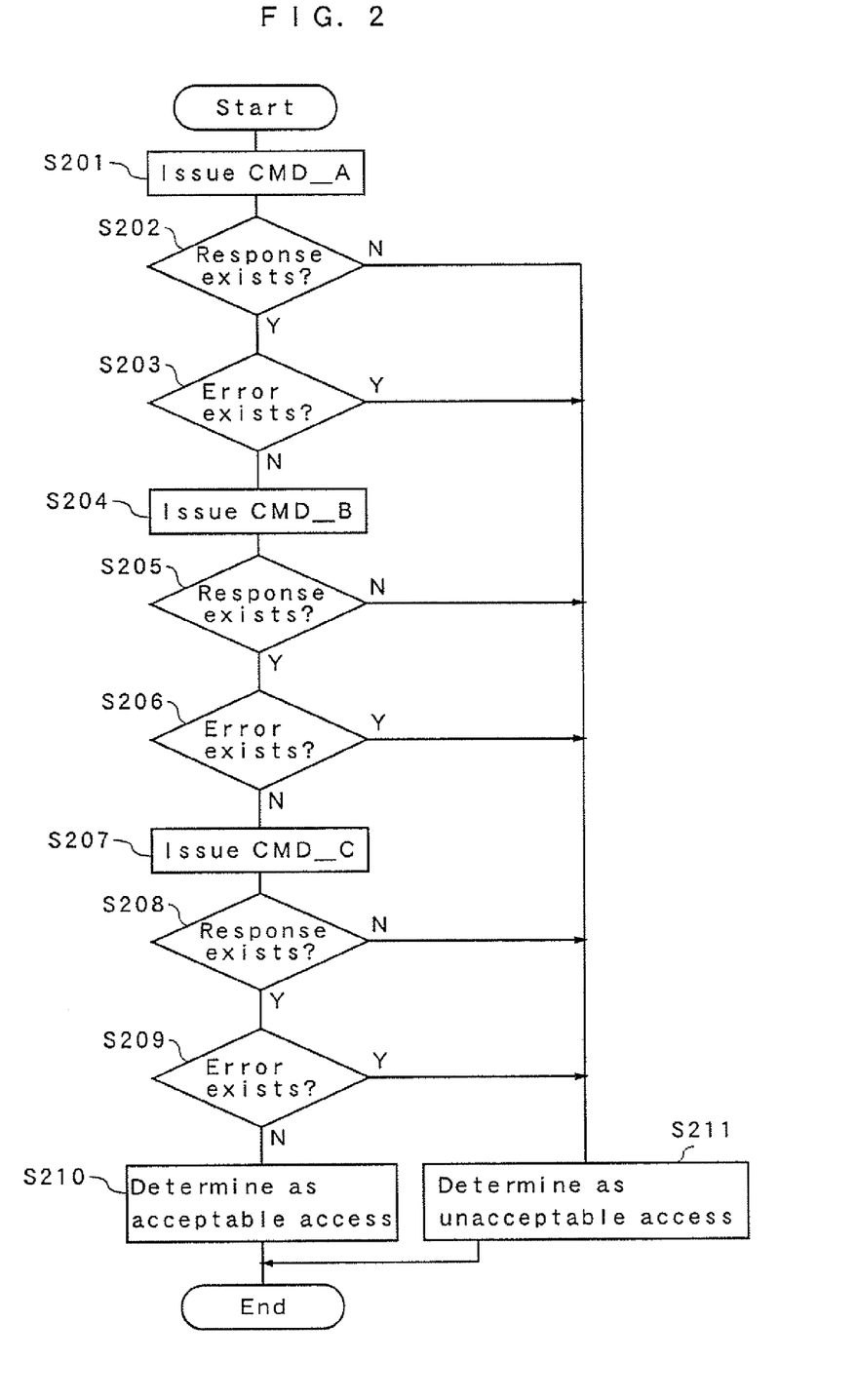
FIG. 2 is a flowchart showing first command sequence processing in a host device.

FIG. 2 is a flowchart showing a first example of a command sequence transmitted by the host device 1. In the command sequence of FIG. 2, the host device 1 transmits a command CMD_A at first (S201). And then the host device waits for a response from the storage device 2 (S202) and checks an error when receiving a response (S203). When the response is received and no error exists, a command CMD_B is transmitted at step S204. And, the host device waits for a response (S205) and checks an error when receiving the response (S206). When the response is received and no error exists, a command CMD_C is transmitted at step S207. And, the host device waits for a response at S208 and checks an error when receiving the response (S209). When no error exists at S209, it is determined that the storage device 2 approves access from the host device 1 because the response is returned correctly (S210). On the other hand, when no response or an error response is retuned to any of the commands, it is determined that the storage device 2 disapprove access from the host device (S211).

The commands CMD_A, CMD_B, and CMD_C used for the command sequence herein can be any commands which do not change data of the memory 204 in the storage device 2. For instance, a command for accessing a register or command for reading ID of the storage device 2 can be used. A command only for detecting whether normal access to the storage device is possible or not may be used.

Figure 3:
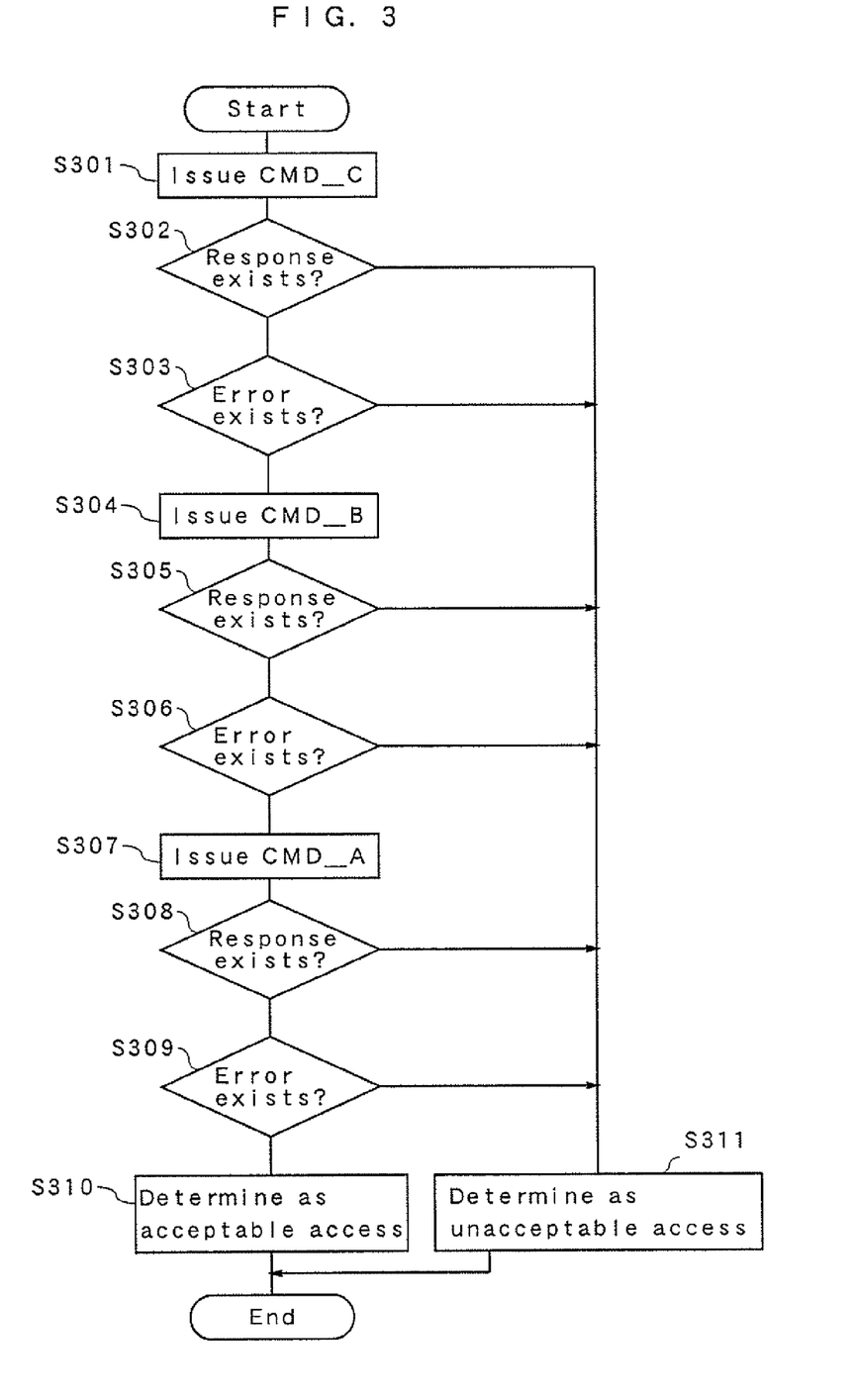
FIG. 3 is a flowchart showing second command sequence processing in the host device.

FIG. 3 is a flowchart showing a second example of a command sequence used by the host device. In the command sequence of FIG. 3, the host device 1 transmits the command CMD_C at first (S301). And then the host device waits for a response from the storage device 2 (S302) and checks an error when receiving the response (S303). When the response is returned and no error exists, the command CMD_B is transmitted at step S304. And, the host device waits for a response (S305) and checks an error when receiving the response (S306). When the response is received and no error exists, the command CMD_A is transmitted at step S307. And, the host device waits for a response at S308 and checks an error at S309 when receiving the response. When no error exists at S309, it is determined that the storage device 2 can accept access from the host device since the response is returned correctly (S310). When no response or an error response is retuned to any of the commands, it is determined that the storage device 2 does not accept access from the host device (S311). When it is determined that access is unacceptable, the storage device may completely reject a subsequent command from the host device or may wait for a correct sequence again.

The host device 1 may use only a specific command sequence, for example, a host device meeting a standard of an old version may use one of the command sequences of FIG. 2 and FIG. 3 and a host device meeting a standard of a new version may use other command sequence. In addition, the host device meeting the standard of the new version may use both of the command sequences of FIG. 2 and FIG. 3.

Figure 4:
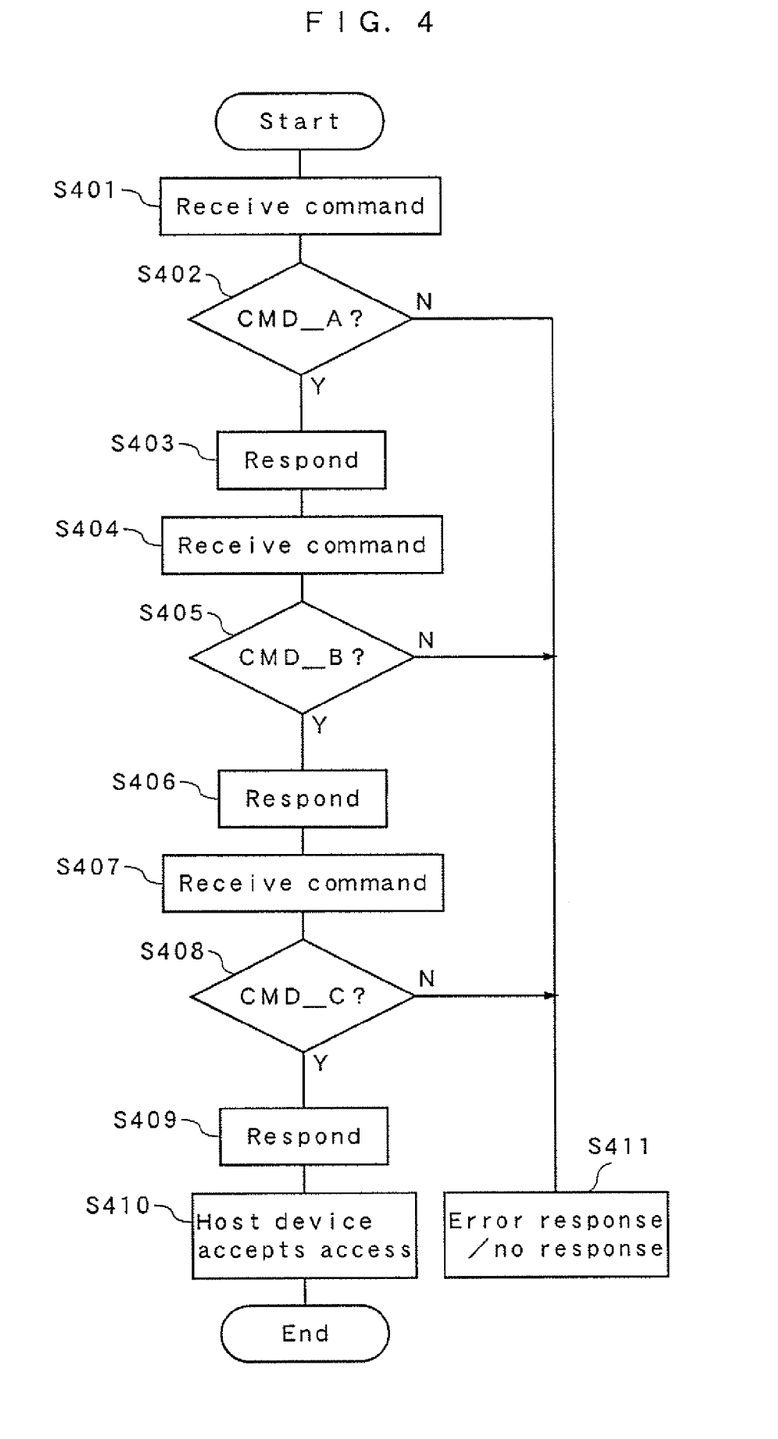
FIG. 4 is a flowchart showing reception processing of the first command sequence in a storage device.

FIG. 4 is an example of a flowchart of command reception processing in the storage device 2 accepting a first command sequence. When a command is received by the command reception unit 202a (S401), the storage device 2 checks whether the command is a CMD_A or not. In the case of this command, the storage device executes the command at step S403 and responds to the command. Further mores command reception is checked at step S404, when a command is received, it is checked whether the command is a CMD_B or not (S405). When the command is the CMD_B the storage device executes the command and responds at step S406, and waits for a next command. When a command is further received at step S407, it is checked whether the command is a CMD_C or not at step S408. In the case of the command, the storage device executes the command and responds at step S409. Since the commands correspond to a predetermined sequence, the storage device accepts subsequent access of a host device and responds to this (S410). After that, access of the host device is accepted with data-writing to the storage area 201.

On the other hand, when the commands do not meet the predetermined sequence, an error response is made (S411). In FIG. 4, the storage device 2 accepts only access of the host device transmitting a command in the sequence of commands CMD_A, CMD_B, and CMD_C shown in FIG. 2. In addition to the error response, the order of the command sequence to be accepted by the storage device may be transmitted to the host device 1. In stead of the error response at S411, no response may be taken as an error.

Figure 5:
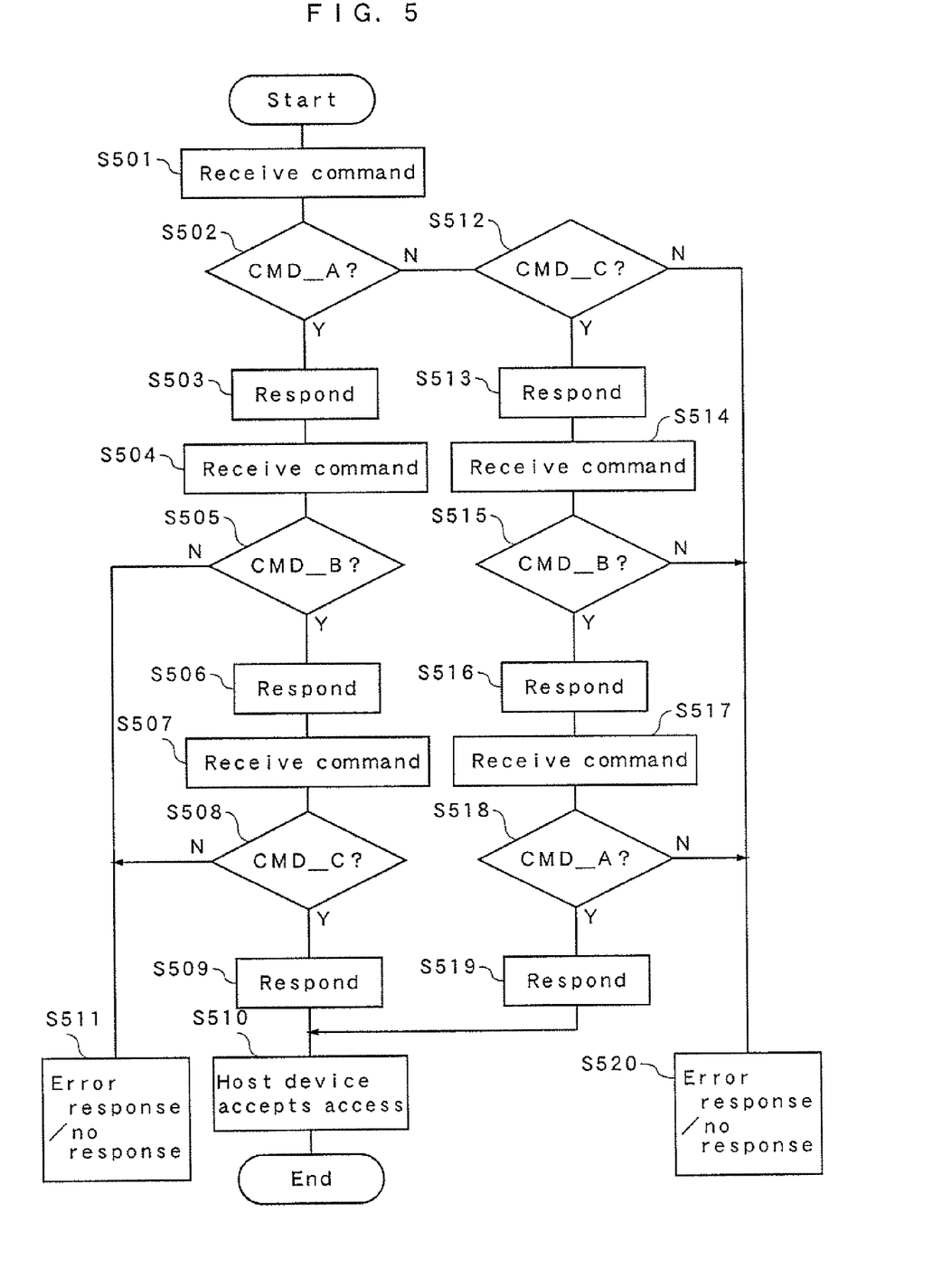
FIG. 5 is a flowchart showing reception of the first and second command sequence processing in the storage device.

FIG. 5 is a flowchart showing command reception processing of the storage device 2 corresponding to the first and second command sequences. In FIG. 5, when a command is received at S501, it is checked whether the command is the CMD_A or not (S502). In the case that the command is the CMD_A, the storage device executes necessary processing and responds (S503) and, subsequently, receives a command. Subsequent processing of S504 to S511 is the same as the processing of S404 to S411 in FIG. 4.

When a command is not the CMD_A in S502, it is checked whether the command is the CMD_C or not. When the command is the CMD_C, the storage device responds at S513 after executing the command and waits for a command at step S514. When the command is received, it is determined whether the command is the command CMD_B (S515) or not, when the command is the CMD_B, the storage device executes necessary processing and responds (S516). When a further command is received (S517), it is determined whether the command is the CMD_A (S518) or not. When the command is the CMD_A, the storage device executes necessary processing, responds (S519), and accepts access by a host device (S510). In addition, since the accepted command sequence is different from that in S509, access may be accepted as a command sequence having a different function on the storage device side at step S519. When the command sequence is different from the predetermined sequence in steps S512 to S518, the storage device executes an error response or does not respond (S520). Thus the storage device 2 can determine a plurality of command sequences. That is, the storage device 2 accepts access from the host device transmitting a command in the first or second sequence shown in FIG. 2 or FIG. 3. Since the number of sequences determined by the storage device 2 is not limited to two, more sequences can be determined.

Figure 6:
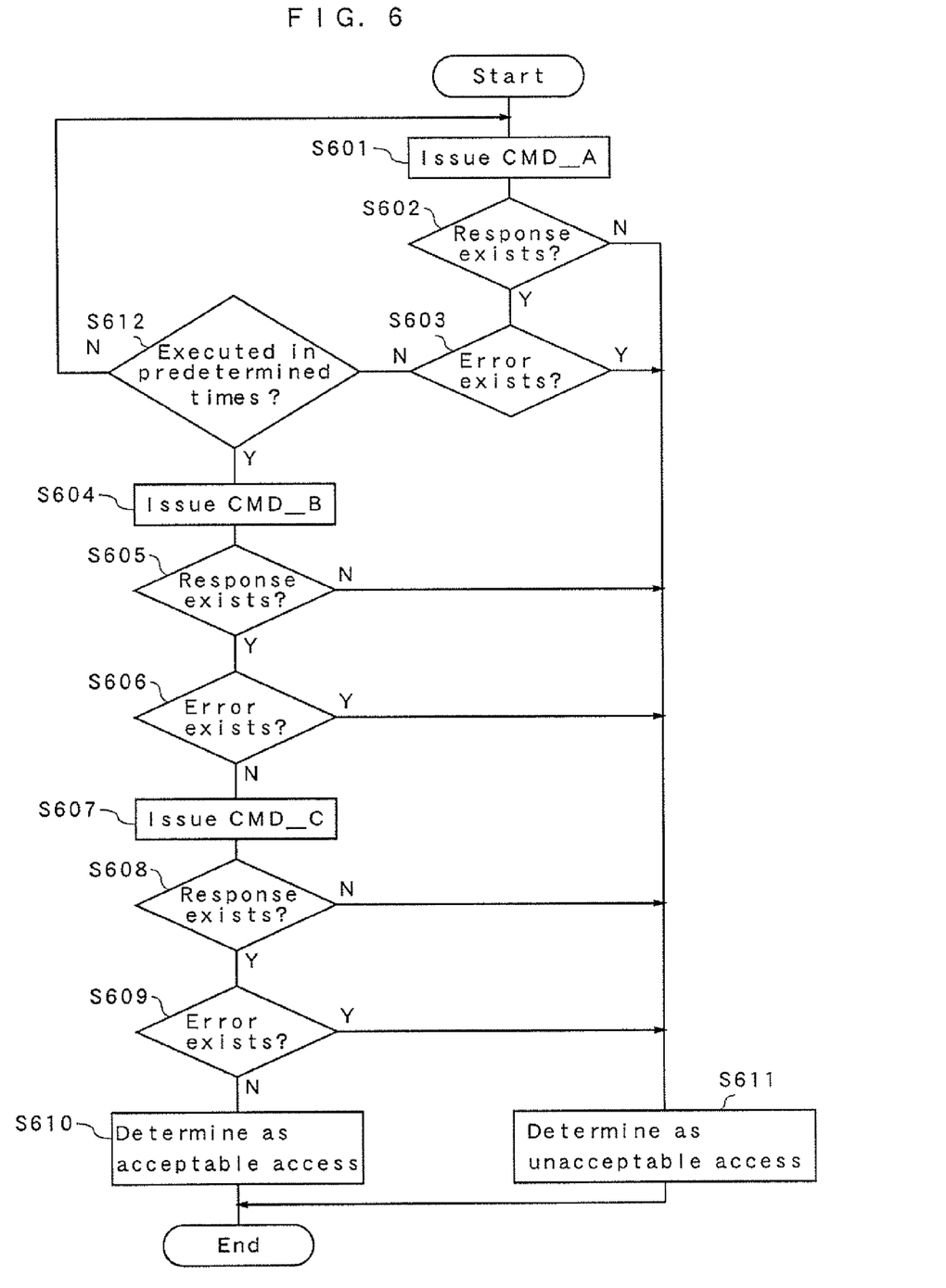
FIG. 6 is a flowchart showing third command sequence processing in the host device.

Next, a method for increasing kinds of command sequences with use of three commands will be explained. FIG. 6 is a flowchart showing command transmission processing by the third command sequence from the host device 1. When an operation starts, the command CMD_A is transmitted at S601 and it is determined whether a response is received or not (S602). And, when the response to the CMD_A is received, an error is checked at S603, if no error exists, the CMD_A is transmitted in the predetermined number of times in a similar way (S601, S602, and S612). After that, the command CMD_B is issued. Subsequent processing of S604 to S611 is the same as that of S204 to S211 in FIG. 2.

Figure 7:
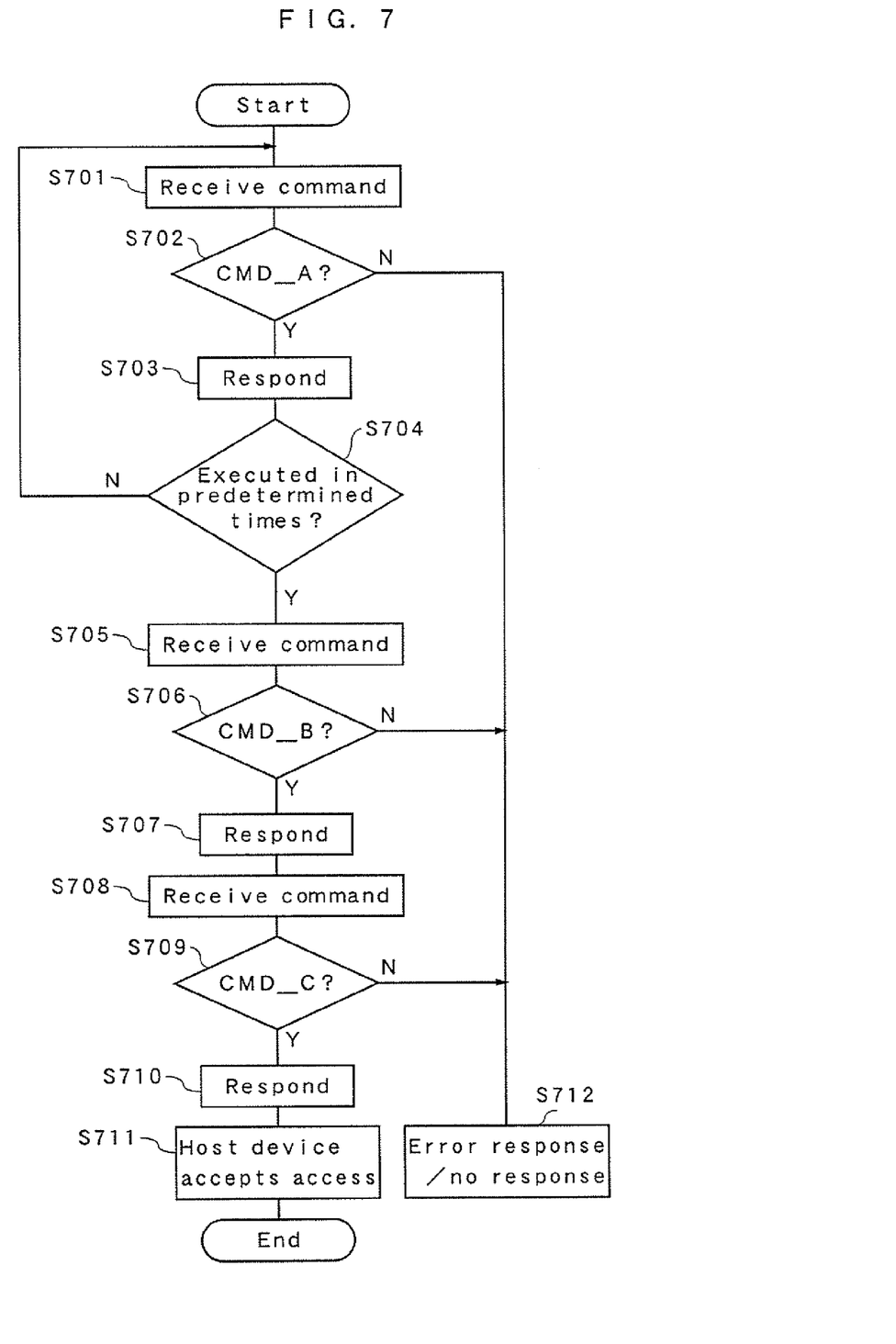
FIG. 7 is a flowchart showing reception processing of the third command sequence in the storage device.

A flowchart on the side of the storage device 2 corresponding to the third command sequence will be explained with use of FIG. 7. When the storage device 2 receives a command in a manner shown in the flowchart of FIG. 7 (S701), the storage device determines whether the command is the command CMD_A or not (S702). When the received command is the CMD_A, the storage device 2 returns a response to the host device 1 and repeats similar processing until the number of repeats exceeds the number of predetermined times (S703 and S704). When the command is not the CMD_A, the storage device may return an error response at S712 or no response may be taken as an error.

Subsequent processing of S705 to S711 are the same as that of above described S404 to s410 of FIG. 4, and when commands are received in order of the commands CMD_B (S706) and CMD_C (S709), the storage device 2 determines that access by the host device 1 is acceptable. When the commands are not the command sequence, an error response or no response is made at S712.

Figure 8:
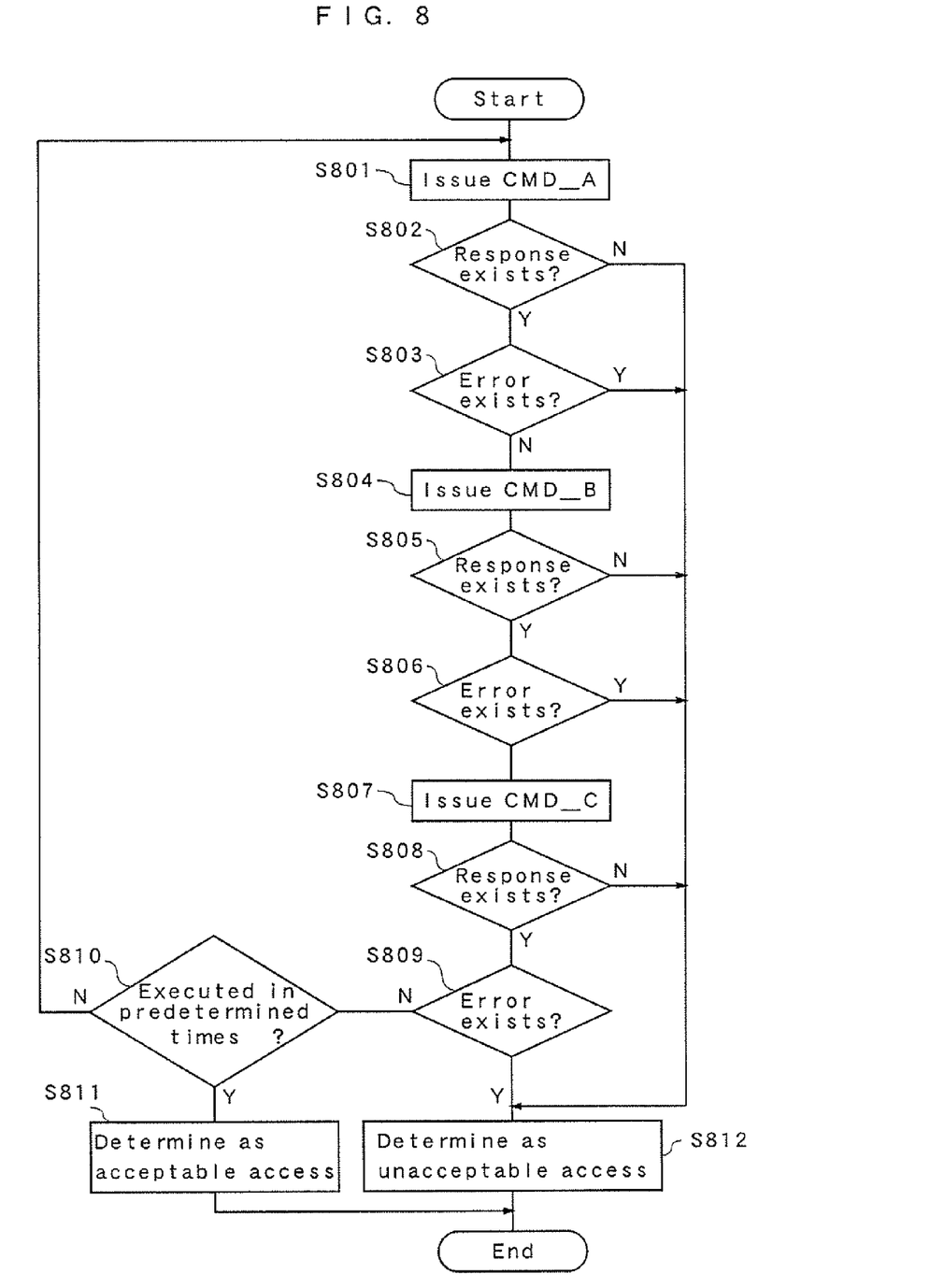
FIG. 8 is a flowchart showing fourth command sequence processing in the host device.

Next, FIG. 8 is a flowchart showing an example of the fourth command sequence of the host device 1. The flowchart shows a specific command sequence, for example the first command sequence, is repeated more than once. Processing of S801 to S809 is the same as that of S201 to S209 and the host device 1 transmits a command in a sequence of the CMD_A (S801), CMD_B (S804), and CMD_C (S807). When no error exists at S809, it is determined whether the sequence is executed in a predetermined number of times at S810 or not. When the times of execution do not achieve the predetermined number, the same processing is repeated back to S801, and, when the execution of the predetermined number of times is done, it is determined that access is acceptable at S811. When there is no normal response in the process of the sequence, it is determined that access is unacceptable at S812.

Figure 9:
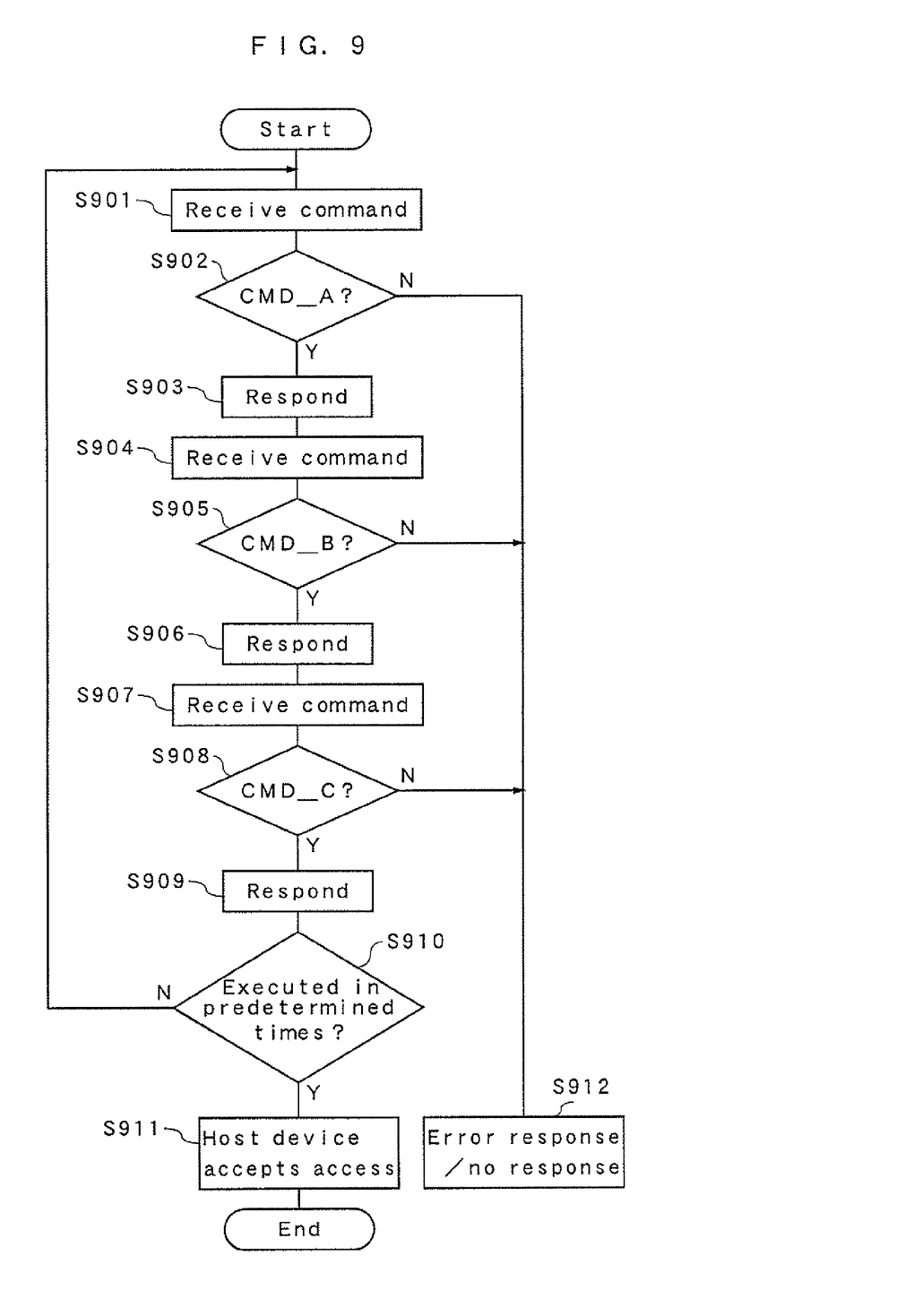
FIG. 9 is a flowchart showing reception processing of the fourth command sequence in the storage device.

FIG. 9 is a flowchart on the storage device concerning the fourth command sequence. In the flowchart of FIG. 9, processing of S901 to S909 is the same as that of S401 to S409 of FIG. 4. And, it is determined whether the processing is executed in a predetermined number of times or not. When the processing is not executed in the predetermined number of times, the similar processing is repeated back to S901 and, when the execution of the predetermined number of times is done, access of the host device is accepted at S911. If it is not normal in the process of the command sequence, no response or an error response is made and acceptance of access is forbidden at S912. When it is determined access is unacceptable, no subsequent command from the host device may be acceptable or a next correct sequence may be waited for.

Access programs to the storage device 2 in the host device of FIG. 2, FIG. 3, FIG. 6, and FIG. 8 according to the embodiment as shown here are retained in the ROM 102 of the host device 1.

In the embodiment described here, a different sequence is shown by combining the commands CMD_A, CMD_B, or CMD_C, however, an additional other command may be used and commands constructing a sequence may be different from the commands of the combination. In addition, a command sequence transmitting commands in a predetermined number of times is not limited to the third and fourth method and, for example, the host device 1 may combine the determination of the sequence of FIG. 5 with that of FIG. 7. And further, the specific command is transmitted in the predetermined number of times in FIG. 6 and FIG. 7, however, Two or more commands may be transmitted more than once. The specific command is transmitted in the predetermined number of times in FIG. 8 and FIG. 9, however, a plurality of command sequences may be repeated in a predetermined number of times. When the host device 1 transmits a plurality of commands, a transmission interval of the commands may be shorter than a predetermined period. In the case, when a transmission interval of the commands exceeds the predetermined period, the storage device 2 determines that access from the host device 1 is unacceptable. When it is determined that access is unacceptable, subsequent commands from the host device may be rejected or a next correct command sequence may be waited for again.

In the storage device 2, a plurality of command sequences may be acceptable as shown in FIG. 5, in that case, a function for being permitted to use in accordance with the command sequence may be switched. For example, a kind of a file system, that is, a file system such as FAT16, FAT32, or UDF may be selected and it is selected which address is permitted in unit of byte or block. In addition, it may be selected whether an additional function, for example, a function of interruption or high-rate interface is used or not in accordance with a command sequence at start of access.

Figure 10:
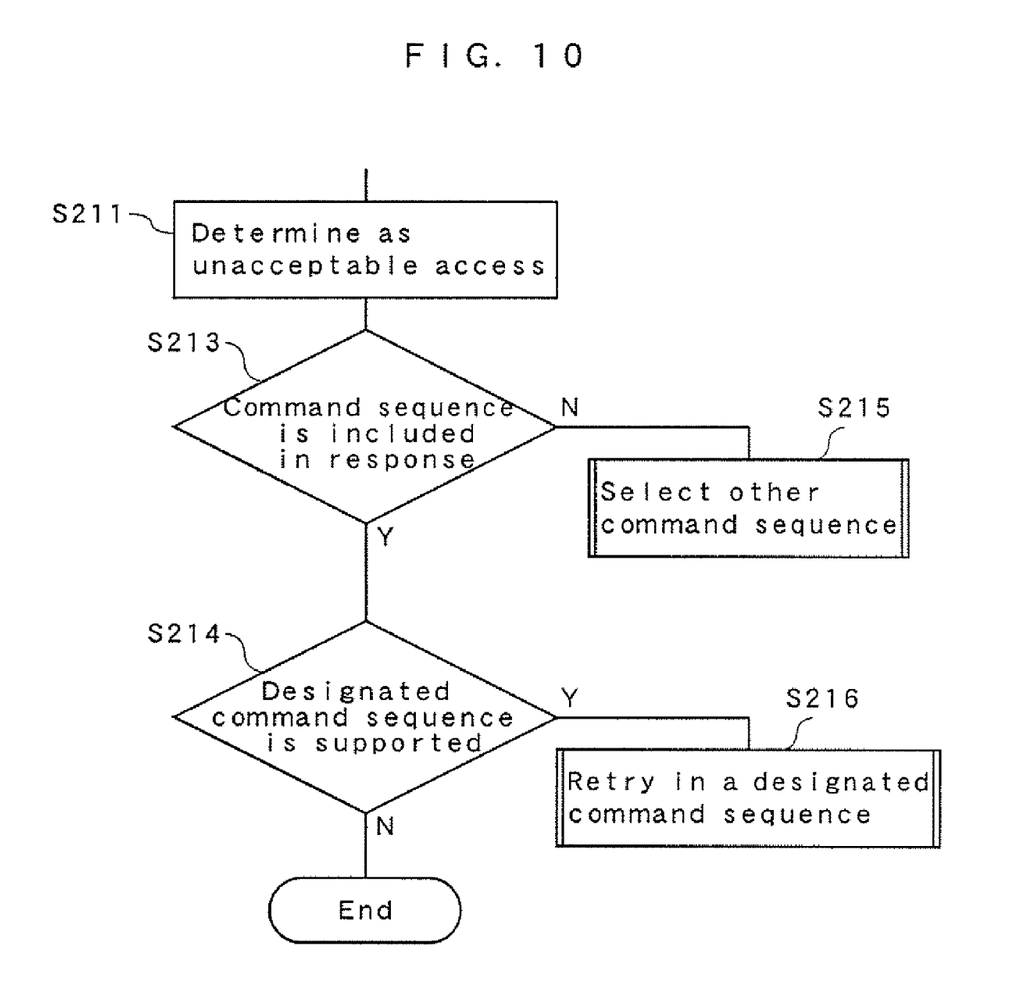
FIG. 10 is a flowchart showing processing after determining access from the host device as unacceptable.

In the storage device 2, an acceptable command sequence may be transmitted in making an error response. An operation on the host device in the foregoing case that the acceptable command sequence is transmitted will be described. FIG. 10 is a flowchart showing processing after the host device determines that access is unacceptable at S211, it is determined whether a command sequence is included in the response or not at S213 after the host device determines that access is unacceptable. When the command sequence is not included at S213, retry is executed by selecting other command sequence at S215 if other command sequence is stored in the host device. When the command sequence is included, it is determined whether a designated command sequence is supported or not at S214. If the command sequence is not supported, processing terminates, and if the command sequence is supported, retry is executed by transmitting a command in a designated command sequence at S216. That is, command transmission starts in the designated command sequence again. Thus, access can be made when a command sequence is identical with a command sequence stored in the storage device.

INDUSTRIAL APPLICABILITY

According to the present invention, the storage device determines a command sequence transmitted by the host device, and determines that access from the host device is acceptable only when the command sequence is identical with a predetermined command sequence. As a result, access control can be executed by simple structure and control and it is useful in a storage device such as a memory card and various sorts of host devices using the storage device.

The invention claimed is:

1. A storage device which is connected to a host device via a bus and which stores and reads data based on a command from said host device, the storage device comprising:
   a memory that stores data received from said host device;
   a memory controller that controls at least one of data-reading from and data-writing to said memory;
   a command receiver that receives a sequence of commands issued from said host device and determines, each time that a command of the sequence of commands is received, whether the received command corresponds to a predetermined command, which is a part of a predetermined command sequence, the command receiver executing the command, only when it is determined that the received command corresponds to the predetermined command of the predetermined command sequence;
   a response transmitter that returns a response of the result of the execution of the command each time that it is determined that the received command corresponds to the predetermined command; and
   an access determiner that determines whether or not the sequence of commands received by said command receiver is the predetermined command sequence and accepts access to the memory from the host device when the received sequence of commands is the predetermined command sequence, the predetermined command sequence being a plurality of commands in a specific order that do not change data stored in the memory.

2. The storage device according to claim 1, wherein said response transmitter returns no response when the received sequence of commands is other than the predetermined command sequence.

3. The storage device according to claim 2, wherein said access determination unit accepts one command sequence.

4. The storage device according to claim 2, wherein said access determination unit is capable of accepting a plurality of command sequences.

5. The storage device according to claim 4, wherein said access determination unit transmits an acceptable command sequence when a command sequence transmitted from said host device is a command sequence that cannot be processed.

6. The storage device according to claim 1, wherein said response transmitter returns an error response when the received sequence of commands is other than the predetermined command sequence.

7. The storage device according to claim 6, wherein said access determination unit accepts one command sequence.

8. The storage device according to claim 6, wherein said access determination unit is capable of accepting a plurality of command sequences.

9. The storage device according to claim 8, wherein said access determination unit transmits an acceptable command sequence when a command sequence transmitted from said host device is a command sequence that cannot be processed.

10. The storage device according to claim 1, wherein the predetermined command sequence is a single predetermined command sequence, and
said access determiner accepts access when the received sequence of commands corresponds to the single predetermined command sequence.

11. The storage device according to claim 1, wherein the predetermined command sequence comprises a plurality of acceptable command sequences, and
said access determiner accepts access when the received sequence of commands is one of the plurality of acceptable command sequences.

12. The storage device according to claim 11, wherein said access determiner transmits one of the acceptable command sequences when the sequence of commands transmitted from said host device is not one of the plurality of acceptable command sequences.

13. The storage device according to claim 1, wherein said storage device is a semiconductor memory card.

* * * * *